United States Patent [19]

Okano

[11] Patent Number: 5,623,326
[45] Date of Patent: Apr. 22, 1997

[54] CAMERA-SHAKE CORRECTION APPARATUS

[75] Inventor: Hiroshi Okano, Tokyo, Japan

[73] Assignee: Nikon Corporation, Tokyo, Japan

[21] Appl. No.: 376,434

[22] Filed: Jan. 23, 1995

Related U.S. Application Data

[63] Continuation of Ser. No. 215,661, Mar. 22, 1994, abandoned, which is a continuation of Ser. No. 104,555, Aug. 11, 1993, abandoned.

[30] Foreign Application Priority Data

Aug. 14, 1992 [JP] Japan .................. 4-062851 U

[51] Int. Cl.$^6$ .................................. G03B 17/00
[52] U.S. Cl. ............................... 396/55; 396/298
[58] Field of Search ................... 354/70, 195.12, 354/202, 289.1–289.2, 400, 486

[56] References Cited

U.S. PATENT DOCUMENTS

| | | | |
|---|---|---|---|
| 4,508,443 | 4/1985 | Matsuzaki et al. | 354/402 |
| 4,857,951 | 8/1989 | Nakajima et al. | 354/400 |
| 5,060,005 | 10/1991 | Itoh et al. | 354/412 |
| 5,146,263 | 9/1992 | Kataoka | 354/70 |
| 5,231,445 | 7/1993 | Onuki et al. | 354/70 |

*Primary Examiner*—David M. Gray

[57] ABSTRACT

A camera-shake correction apparatus includes externally operable operation member for changing the focusing length or the phototaking magnification of a phototaking lens upon being operated, camera-shake detecting means for detecting a camera-shake amount as a displacement of a camera or the phototaking lens with respect to an optical axis, and outputting camera-shake information based on the detected camera-shake amount, camera-shake correction means for reducing the camera-shake amount detected by the camera-shake detecting means, and externally operable setting means for allowing an operation of the camera-shake correction means upon being operated. The setting means is arranged on the operation means.

11 Claims, 5 Drawing Sheets

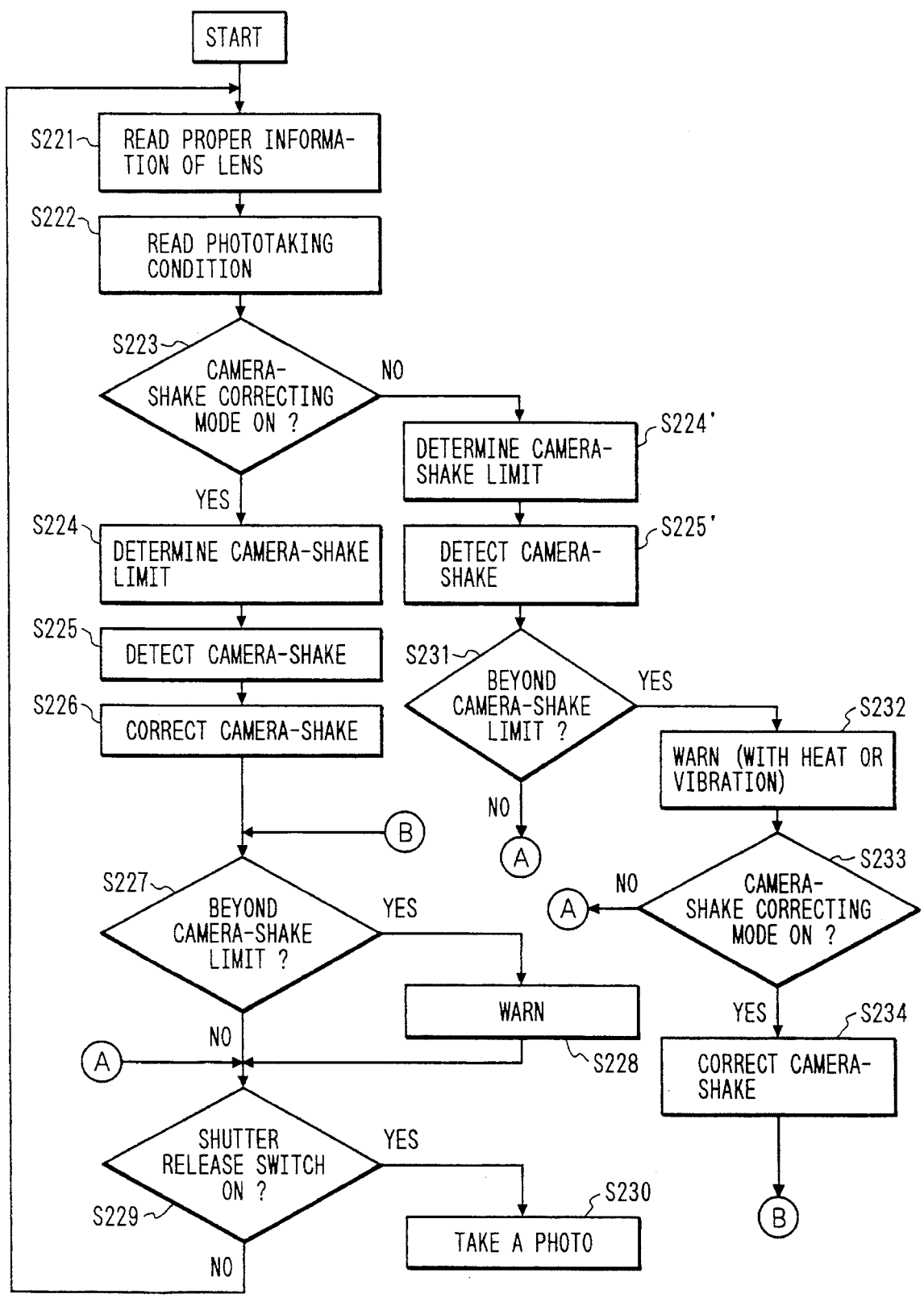

CAMERA-SHAKE CORRECTION APPARATUS

This is a continuation of application Ser. No. 08/215,661 filed Mar. 22, 1994, now abandoned, which is a continuation of application Ser. No. 08/104,555 filed Aug. 11, 1993, (abandoned).

BACKGROUND OF THE INVENTION

1. Field of the Invention

The present invention relates to a camera-shake correction apparatus for detecting a camera-shake caused in a phototaking operation, and correcting the camera-shake.

2. Related Background Art

When a hand-held phototaking operation is performed, especially, when a lens having a large focusing length is used or a low shutter speed is used, a camera-shake easily occurs, and deteriorates image quality of a photograph.

In order to prevent this, an apparatus for correcting an image blur by moving some or all elements of a phototaking optical system in a direction perpendicular to the optical axis is known.

However, the above-mentioned camera-shake correction apparatus undesirably performs camera-shake correction against a photographer's will when a photographer intentionally shakes a camera like in a panning phototaking operation.

When an ON/OFF switch for selecting whether or not camera-shake correction is performed is provided to a camera so as to solve this problem, a photographer must perform a switching operation of a camera-shake correcting mode beside a series of phototaking operations from focus adjustment to shutter release, thus impairing operability. More specifically, a photographer must temporarily release a hand from a focus adjustment ring or a shutter release button, resulting in poor operability.

SUMMARY OF THE INVENTION

It is, therefore, an object of the present invention to provide a camera-shake correction apparatus, which can solve the conventional problem, and has good operability.

In order to achieve the above object, a camera-shake correction apparatus according to the present invention comprises externally operable operation means for changing a focusing length or a phototaking magnification of a phototaking lens upon being operated, camera-shake detecting means for detecting a camera-shake amount as a displacement of a camera or the phototaking lens with respect to an optical axis, and outputting camera-shake information based on the camera-shake amount, camera-shake correction means for reducing the camera-shake amount detected by the camera-shake detecting means, and externally operable setting means for allowing an operation of the camera-shake correction means upon being operated, wherein the setting means is arranged on the operation means.

In this case, the operation means is provided to a lens barrel comprising the phototaking lens.

On the other hand, the setting means preferably includes warning means for performing a tactual warning operation, and control means for operating the warning means upon reception of the camera-shake information from the camera-shake detecting means.

At this time, the warning means preferably performs a warning operation by means of heat. The warning means may perform a warning operation by means of vibration.

According to the present invention, since the setting means for allowing camera-shake correction is arranged on the operation means for changing the focusing length or the phototaking magnification of the phototaking lens by an external operation, good operability can be obtained.

BRIEF DESCRIPTION OF THE DRAWINGS

FIG. 7 is a flow chart showing an operation of the third embodiment of the present invention.

DETAILED DESCRIPTION OF THE PREFERRED EMBODIMENTS

The preferred embodiments of the present invention will be described in detail hereinafter with reference to the accompanying drawings.

Figure 1:
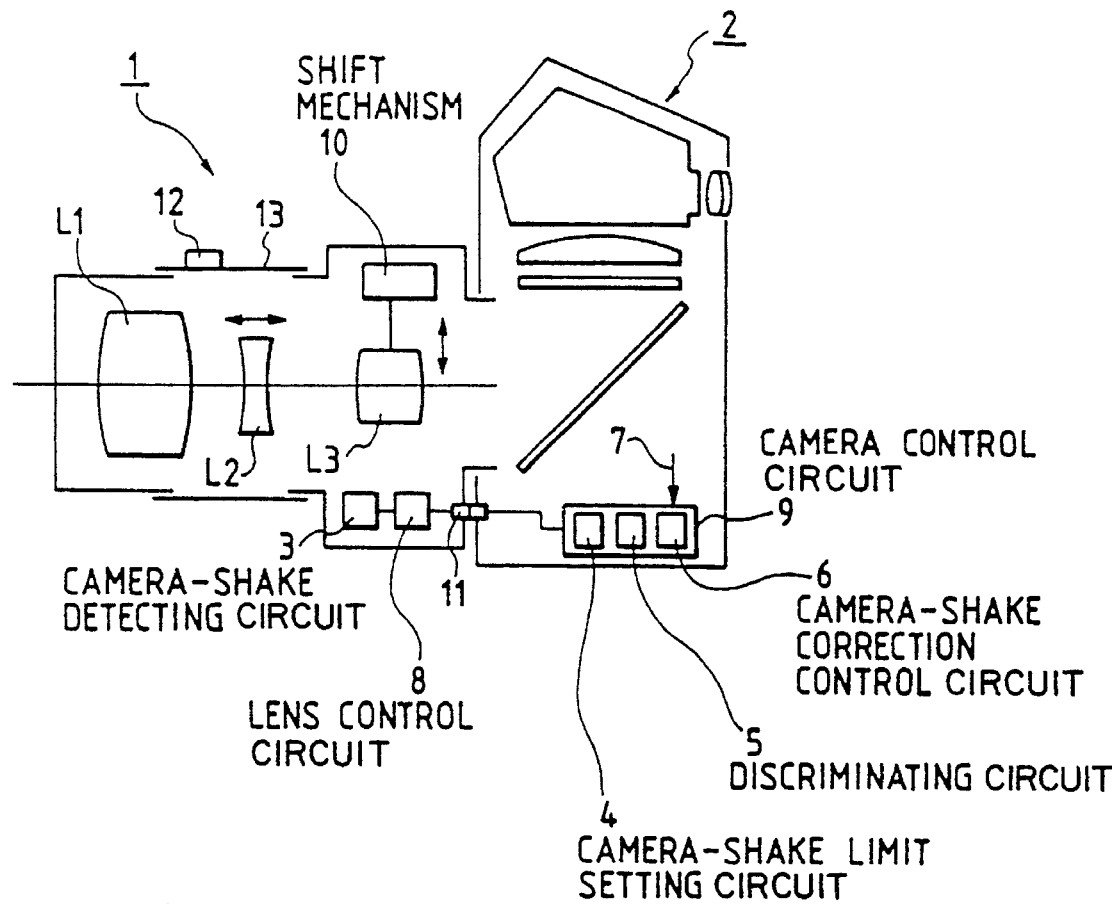
FIG. 1 is a sectional view showing an arrangement of a camera for explaining the first embodiment of a camera-shake correction apparatus according to the present invention.

FIG. 1 is a sectional view for explaining an arrangement of an embodiment of a camera-shake correction apparatus according to the present invention.

Referring to FIG. 1, an exchangeable lens 1 is mounted on a camera body 2. The exchangeable lens 1 comprises a phototaking optical system consisting of a stationary lens group L1, a lens group L2 which is moved in the optical axis direction to realize focusing, and a camera-shake correction lens group L3 which is shifted in a direction perpendicular to the optical axis to correct a camera-shake.

A camera-shake detecting means 3 detects a camera-shake amount as a displacement of the camera body 2 or the exchangeable lens 1 with respect to the optical axis, and outputs camera-shake information based on the detected camera-shake amount. The camera-shake detecting means 3 can comprise, e.g., a velocity sensor, an angular velocity sensor, or the like.

A lens control means 8 comprises a CPU or a ROM arranged in the exchangeable lens 1, and stores, e.g., lens information such as a focusing length, information associated with camera-shake correction, and the like.

An electrical contact 11 connects the lens control means 8 and a camera control means 9 when the exchangeable lens 1 is mounted on the camera body 2.

The camera control means 9 includes a camera-shake limit setting means 4, a discriminating means 5, a camera-shake correction control means 6, and the like, and receives phototaking condition information 7, information from the lens control means 8, and the like. The phototaking condition information 7 includes, e.g., a set shutter speed.

The camera-shake limit setting means 4 calculates and sets a camera-shake limit amount (camera-shake limit value) on the basis of the phototaking condition information 7, and proper information of a lens in the lens control means 8. A strict camera-shake limit value is set when the shutter speed is low or a mounted phototaking optical system has a large focusing length.

The discriminating means 5 compares signals from the camera-shake detecting means 3 and the camera-shake limit setting means 4 to check if the camera-shake value exceeds the camera-shake limit value.

As will be described later, if an allowable value of a camera-shake is defined as a least circle of confusion δ, an allowable camera-shake angular velocity is reciprocally calculated. At this time, the discriminating means 5 compares the camera-shake angular velocity ω with an output $ω_1$ from the camera-shake detecting means 3 to determine which is a larger value.

The camera-shake correction control means 6 controls movement of the camera-shake correction lens group L3 on the basis of the output from the camera-shake detecting means 3. A shift mechanism 10 shifts the camera-shake correction lens group L3 in a direction perpendicular to the optical axis in accordance with the output from the camera-shake correction control means 6.

A camera-shake correcting or correction mode selection switch 12 is used for selecting whether a camera-shake correcting mode is performed, and is arranged on a focus adjustment ring 13.

The phrase "on a focus adjustment ring 13" means that the switch is directly arranged on or beside a member such as a ring.

Figure 5:
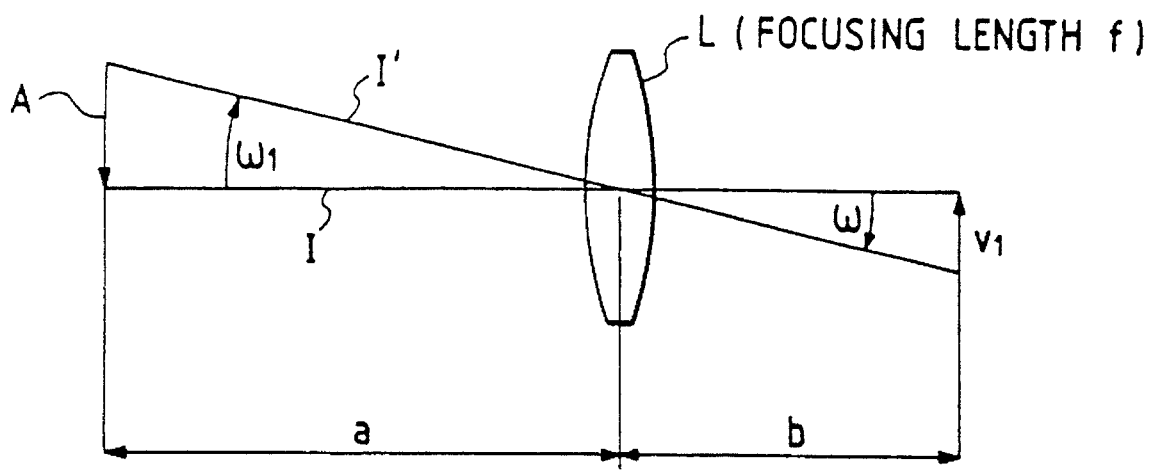
FIG. 5 is a diagram showing the relationship between a camera-shake and an image blur.

The relationship between the angular velocity (the output from the camera-shake detecting means 3) upon inclination of the camera, and image blurring will be described below with reference to FIG. 5.

If we let a be the distance from a lens L to an object, b be the distance to an imaging plane, and f be the focusing length of the lens L, then the following imaging formula is established:

$$1/a + 1/b = 1/f \quad (1)$$

From this formula, assume that an optical axis I is inclined to an optical axis I' at an angular velocity $ω_1$. At this time, a moving velocity $v_1$ of an image on the imaging plane is expressed by:

$$v_1 = (af ω_1)/(a-f) \quad (2)$$

If we let t be the shutter speed, then a camera-shake amount $d_1$ is given by:

$$d_1 = v_1 t \quad (3)$$

If this camera-shake amount $d_1$ is smaller than, e.g., the least circle of confusion δ (δ=1/30 mm), an image is not blurred; otherwise, the image is blurred.

When the camera-shake correction control means 6 operates, it can move an image on the imaging plane at a velocity $v_2$. A camera-shake amount d at that time is given by:

$$(v_1 - v_2)t \quad (4)$$

If this camera-shake amount d is smaller than the least circle of confusion δ, an image is not blurred; otherwise, the image is blurred.

Figure 2:
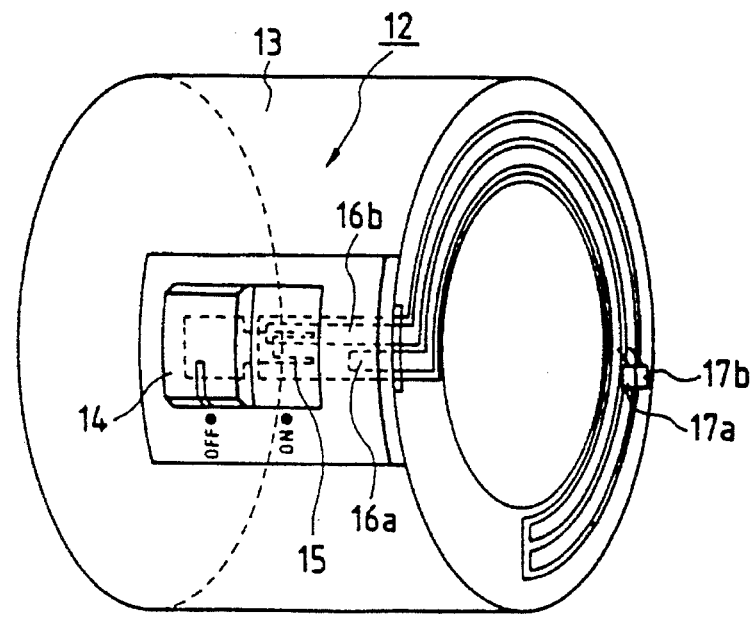
FIG. 2 is a perspective view showing an arrangement of a camera-shake correcting mode selection switch according to the present invention.

FIG. 2 is a perspective view showing an arrangement of the camera-shake correcting mode selection switch.

The camera-shake correcting mode selection switch 12 is arranged on the focus adjustment ring 13. More specifically, a slide switch 14 is held by the focus adjustment ring 13, and a sliding brush 15 is integrally provided to the slide switch 14. The sliding brush 15 slides on a conductive pattern 16a arranged on the focus adjustment ring 13.

The conductive pattern 16a is formed to be electrically connected to or disconnected from a ground line 16b depending on the setting position of the slide switch 14, and allows discrimination of the setting position of the slide switch 14.

The conductive pattern 16a extends along the end face of the focus adjustment ring 13 in an arc shape. Upon rotation of the focus adjustment ring 13, sliding brushes 17a and 17b slide on the conductive pattern 16a. These sliding brushes 17a and 17b are provided to a stationary member (not shown), and supply setting position information of the camera-shake correcting mode selection switch 12 to the camera control means 9 via the electrical contact 11.

Figure 3:
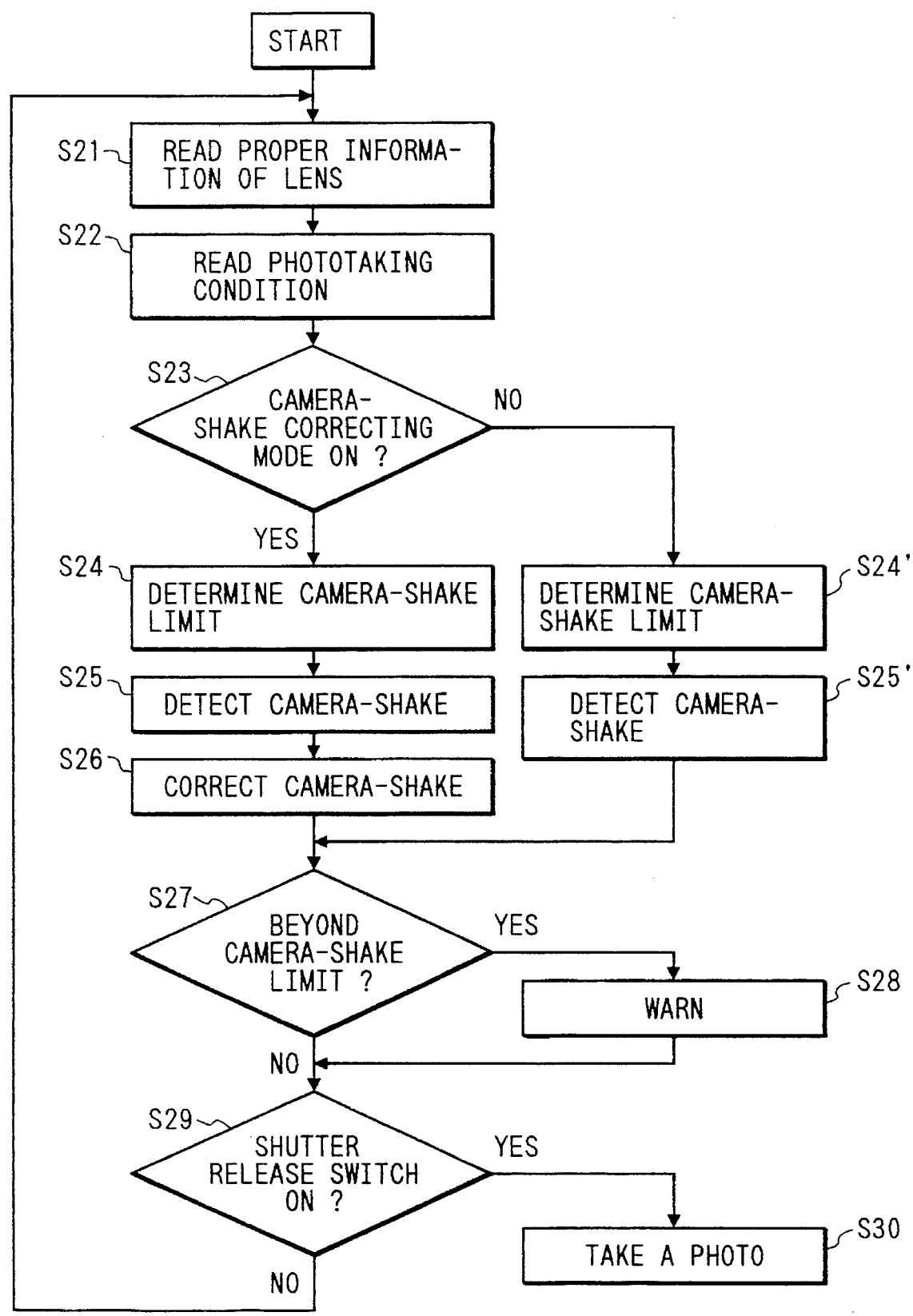
FIG. 3 is a flow chart showing an operation of the first embodiment.

The operation of the first embodiment will be described below with reference to the flow chart shown in FIG. 3.

When a main switch (not shown) of the camera body 2 is turned on, proper information of the lens in the lens control means 8 is read by the camera-shake limit setting means 4 (step 21; to be described as S21 hereinafter). The camera-shake limit setting means 4 reads the phototaking condition information 7 as signal information (S22).

Then, a mode set by the camera-shake correcting mode selection switch 12 is identified (S23). When the camera-shake correcting mode selection switch 12 is ON (to perform camera-shake correction), the camera-shake limit setting means 4 determines a camera-shake limit value on the basis of the input signals (S24), and inputs signal information to the discriminating means 5. The camera-shake limit value is determined in consideration of camera-shake correction, as described above.

The camera-shake detecting means 3 detects a camera-shake (S25), and inputs signal information to the discriminating means 5 in accordance with a vibration. The camera-shake correction control means 6 controls the shift mechanism 10 to move the camera-shake correction lens group L3 in accordance with signal information from the camera-shake detecting means 3, thus controlling camera-shake correction (S26).

When the camera-shake correcting mode selection switch 12 is OFF (not to perform camera-shake correction), a camera-shake limit value which does not consider camera-shake correction is determined (S24'), and camera-shake correction is performed (S25').

The discriminating means 5 compares signal information from the camera-shake detecting means 3 with signal information from the camera-shake limit setting means 4 to check if the camera-shake amount exceeds the limit value (S27). When the camera-shake amount exceeds the limit value, a warning operation such as generation of a warning tone is performed (S28), and the flow advances to step 29. When the camera-shake amount does not exceed the limit value, an ON/OFF state of a shutter release switch is detected (S29). When the shutter release switch is OFF, the flow returns to the beginning of the operation (S21) to repeat the above-mentioned operation. When the shutter release switch is ON, a series of phototaking operations are performed (S30).

Figure 4:
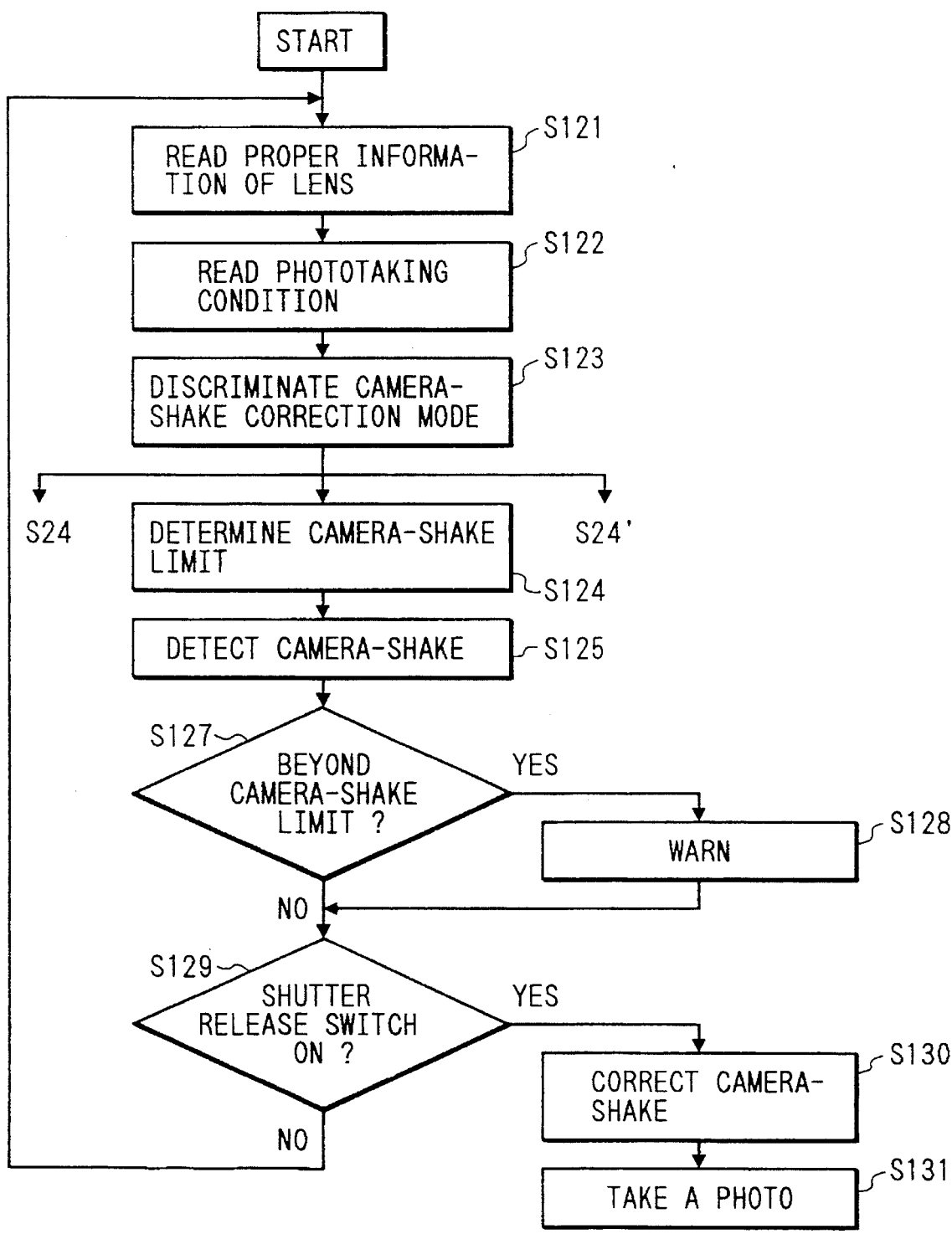
FIG. 4 is a flow chart showing an operation of the second embodiment of a camera-shake correction apparatus according to the present invention.

FIG. 4 is a flow chart showing the second embodiment of a camera-shake correction apparatus according to the present invention. In this embodiment, a mode for performing camera-shake operation only during exposure is added.

In the second embodiment, a set of the sliding brush 15, the conductive pattern 16a, and the sliding brush 17 shown in FIG. 2 are arranged in correspondence with three positions so as to detect three different setting positions of the slide brush 15.

A repetitive description of other arrangements and the same operations (S21 and S121, and S22 and S122) as in the first embodiment will be omitted, and only a difference will be described below.

In step 123, it is checked if a camera-shake correcting mode is set in either of mode 1, mode 2, or OFF. Mode 1 is the same as the state wherein the camera-shake correcting mode is ON in the first embodiment. When mode 1 is detected, the flow advances to step 24 in the first embodiment. OFF is the same as the state wherein the camera-shake correcting mode is OFF in the first embodiment. When OFF is detected, the flow advances to step 24' in the first embodiment. Mode 2 is a mode for performing camera-shake correction during only exposure.

When mode 2 is detected, a camera-shake limit value is determined as in other modes (S124), and a camera-shake is detected (S125). The discriminating means 5 compares signal information from the camera-shake detecting means 3 with signal information from the camera-shake limit setting means 4 to check if the camera-shake amount exceeds the limit value (S127).

When the camera-shake amount exceeds the limit value, a warning operation such as generation of a warning tone is performed (S128), and the flow advances to step 129.

When the camera-shake amount does not exceed the limit value, an ON/OFF state of a shutter release switch is detected (S129). When the shutter release switch is OFF, the flow returns to the beginning of the operation (S121) to repeat the above-mentioned operation. When the shutter release switch is ON, camera-shake correction is performed (S130), and a series of phototaking operations are performed (S131).

Figure 6:
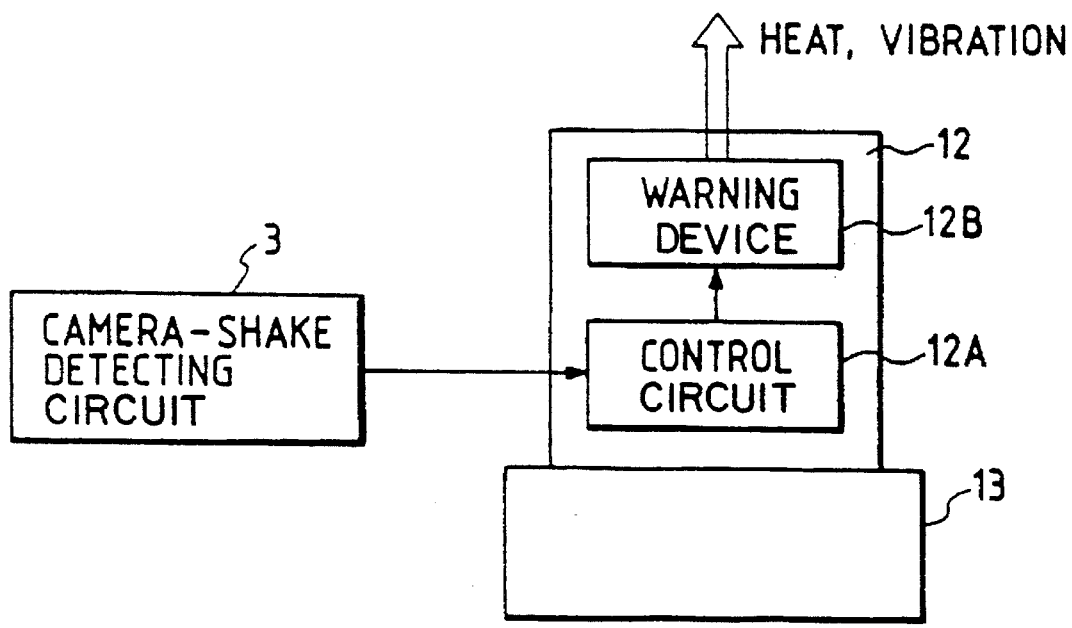
FIG. 6 is a block diagram showing the third embodiment of a camera-shake correction apparatus according to the present invention.

FIG. 6 is a block diagram showing the third embodiment of a camera-shake correction apparatus according to the present invention, and FIG. 7 is a flow chart for explaining an operation.

The camera-shake correcting mode selection switch 12 is arranged on the focus adjustment ring 13 in the same manner as in the first embodiment. However, in the third embodiment, as shown in FIG. 6, the camera-shake correcting mode selection switch 12 includes a control means 12A and a warning means 12B.

The control means 12A operates the warning means 12B upon reception of camera-shake information from the camera-shake detecting means 3. The warning means 12B performs a tactual warning operation by means of heat or vibration.

The operation of the third embodiment will be described below with reference to FIG. 7. The same numerals as in the steps in the first embodiment are attached to the lower digits of the step numbers of the same steps, and a detailed description thereof will be omitted.

When the camera-shake correcting mode is not set (S223), a camera-shake limit value is determined (S224'), and thereafter, a camera-shake is detected (S225').

In the third embodiment, it is checked if the detected camera-shake amount exceeds the camera-shake limit value (S231). When the camera-shake amount exceeds the camera-shake limit value, the warning means 12B performs a tactual warning operation by means of, e.g., heat or vibration (S232).

When a photographer receives the tactual warning from the warning means 12B arranged on the focus adjustment ring 13, he or she decides by himself or herself whether or not camera-shake correction is performed, and can turn on the camera-shake correcting mode selection switch 12 without re-holding the camera.

Referring back to FIG. 7, it is checked if the camera-shake correcting mode selection switch 12 is ON (S233). If the switch 12 is ON, camera-shake correction is performed (S234), and thereafter, the flow advances to step 227. Otherwise, the flow advances to step 229.

The present invention is not limited to the above embodiments, and various changes and modifications may be made. The present invention includes these changes and modifications.

For example, referring to FIG. 1, the camera-shake correction lens group L3 is arranged at the far end of the phototaking optical system from the object side. However, the present invention is not limited to this. The camera-shake detecting means 3 is arranged in the exchangeable lens 1, but may be arranged in the camera body 2.

The camera-shake limit setting means 4, the discriminating means 5, and the camera-shake correction control means 6 constitute the camera control means 9 in the camera body 2. However, these means may be controlled by the lens control means 8 in the exchangeable lens 1. Also, these means may be divisionally controlled by the camera body 2 and the exchangeable lens 1.

The warning operation (S28, and the like) is achieved by arranging the camera-shake limit setting means 4 and the discriminating means 5. However, the warning operation may be omitted.

In the arrangement of the camera-shake correcting mode selection switch 12, the conductive pattern 16a may be loosened in correspondence with the rotational angle of the focus adjustment ring 13, thereby omitting the sliding brushes 17a and 17b.

In this embodiment, the camera-shake correction lens group is used as means for correcting a camera-shake. However, the present invention is not limited to this. For example, means for automatically controlling the shutter speed to a speed free from a camera-shake in accordance with camera-shake information may be adopted.

As an operation member, the focus adjustment ring 13 of the exchangeable lens 1 has been exemplified. However, the operation member is not limited to a member for performing focus adjustment, but may be a member for performing zoom adjustment. For example, since a camera-shake easily occurs when the zoom mode is switched to the telephoto side, it is very effective to turn on the camera-shake correcting mode selection switch without re-holding a camera in a zoom adjustment state.

At this time, even when the operation member is arranged on the camera body like in a compact camera, the setting member (camera-shake correcting mode selection member) may be arranged on the operation member, thus achieving the present invention.

As described above, according to the present invention, since the camera-shake correcting mode can be selected .while executing a focus adjustment operation or a zoom operation, a camera-shake correction apparatus with good operability can be obtained. Therefore, a photographer can concentrate on phototaking preparation such as framing, and can be prevented from losing a shutter chance.

Since a tactual warning operation is performed when the camera-shake amount exceeds a camera-shake limit value, the camera-shake correcting mode can be efficiently selected.

Furthermore, since the camera-shake correcting mode can be easily selected, it can be quickly turned off when no camera-shake correction is required, thus preventing unnecessary power consumption of a battery.

What is claimed is:

1. A camera-shake correction apparatus comprising:

externally operable operation means for focusing a phototaking lens or changing a phototaking magnification of a phototaking lens upon being operated;

camera-shake detecting means for detecting a camera-shake amount as a displacement of a camera or said phototaking lens with respect to an optical axis, and outputting camera-shake information based on the detected camera-shake amount;

camera-shake correction means for reducing the camera-shake amount detected by said camera-shake detecting means; and externally operable setting means for allowing an operation of said camera-shake correction means upon being operated, wherein said setting means is arranged on said operation means.

2. An apparatus according to claim 1, wherein said operation means is arranged on a lens barrel comprising said phototaking lens.

3. An apparatus according to claim 1, wherein said setting means comprises:

warning means for performing a tactual warning operation; and control means for operating said warning means upon reception of the camera-shake information from said camera-shake detecting means.

4. An apparatus according to claim 3, wherein said warning means performs a warning operation by means of heat.

5. An apparatus according to claim 3, wherein said warning means performs a warning operation by means of vibration.

6. A camera-shake correction apparatus comprising:

an externally operable operation member to focus a phototaking lens or to change a phototaking magnification of the phototaking lens upon being operated;

a camera-shake detector to detect a camera-shake amount as a displacement of a camera or said phototaking lens with respect to an optical axis, and to output camera-shake information based on the detected camera-shake amount;

a camera-shake correction unit to reduce the camera-shake amount detected by said camera shake detecting means; and an externally operable setting member to allow an operation of said camera-shake correction unit upon being operated, wherein said setting member is arranged on said operation member.

7. A camera-shake correction apparatus according to claim 1, wherein said setting means is displaceable in a direction different from an operating direction of said operation means.

8. A camera-shake correction apparatus according to claim 7, wherein said operation means is rotatable about a predetermined rotation axis and displaceable in a direction of the predetermined rotation axis.

9. A camera-shake correction apparatus comprising:

shake detecting means for detecting a shake amount as a displacement of a camera or a phototaking lens with respect to an optical axis, and outputting shake information based on the detected shake amount;

shake correction means for reducing the shake amount detected by said shake detecting means; and setting means provided on a lens barrel of said phototaking lens, externally operable and allowing an operation of said shake correction means upon being operated.

10. A camera-shake correction apparatus comprising:

a camera-shake detector to detect a camera-shake amount as a displacement of a camera or a phototaking lens with respect to an optical axis, and to output camera-shake information based on the detected camera shake amount;

a camera-shake correction unit to reduce the camera-shake amount detected by said camera-shake detector; and an externally operable setting member arranged on a lens barrel of said phototaking lens to allow an operation of said camera-shake correction unit upon being operated.

11. A barrel for a phototaking lens of a camera, comprising:

a shake correction unit for reducing a shake amount as a displacement of a camera or the phototaking lens with respect to an optical axis; and setting means provided on said barrel, externally operable and allowing an operation of said shake correction unit upon being operated.

* * * * *

UNITED STATES PATENT AND TRADEMARK OFFICE
CERTIFICATE OF CORRECTION

PATENT NO. : 5,623,326

DATED : April 22, 1997

INVENTOR(S) : Hiroshi OKANO

It is certified that error appears in the above-indentified patent and that said Letters Patent is hereby corrected as shown below:

Title Page, under "Foreign Application Priority Data", the priority number should read --U.M. 4-062851--.

Title Page, under "Abstract", delete the abstract and substitute with the following:

--A camera-shake correction apparatus includes an externally operable operation member for changing the focusing length or the phototaking magnification of a phototaking lens upon being operated. A camera-shake detecting circuit detects a camera-shake amount as a displacement of a camera or the phototaking lens with respect to an optical axis, and outputs camera-shake information based on the detected camera-shake amount. A camera-shake correction circuit reduces the camera-shake amount detected by the camera-shake detecting circuit. An externally operable setting device allows operation of the camera-shake correction circuit upon being operated.--.

Col. 2, line 50, after "detecting" insert --circuit or--;

line 54, change "means" to --circuit--;

line 57, after "control" insert --circuit or--;

UNITED STATES PATENT AND TRADEMARK OFFICE
CERTIFICATE OF CORRECTION

PATENT NO. : 5,623,326
DATED : April 22, 1997
INVENTOR(S) : Hiroshi OKANO

It is certified that error appears in the above-indentified patent and that said Letters Patent is hereby corrected as shown below:

Col. 2,      line 61, change "means" to --circuit--;

line 62, change "means" to --circuit--;

line 64, after "control" insert --circuit or--;

line 65, change "means" to --circuit-- (both occurrences);

line 66, change "means" to --circuit--;

Col. 3,      line 1, change "means" to --circuit--;

line 3, change "means" to --circuit--;

line 6, change "means" to --circuit--;

line 10, change "means" to --circuit--;

line 11, change "means" to --circuit--;

line 12, change "means" to --circuit--;

line 16, after "velocity" insert --$\omega$--;

line 17, change "means" to --circuit--;

UNITED STATES PATENT AND TRADEMARK OFFICE
CERTIFICATE OF CORRECTION

PATENT NO. : 5,623,326

DATED : April 22, 1997

INVENTOR(S) : Hiroshi OKANO

It is certified that error appears in the above-indentified patent and that said Letters Patent is hereby corrected as shown below:

Col., 3    line 19, change "means" to --circuit--;

line 21, change "means" to --circuit--;

line 24, change "means" to --circuit--;

line 27, change "means" to --circuit--;

line 36, change "means" to --circuit--;

line 39, after "object," insert --let--;

line 40, after "and" insert --let--;

Col. 4,    line 24, change "means" to --circuit--;

line 29, change "means" to --circuit-- (both occurrences);

line 31, change "means" to --circuit--;

line 37, change "means" to --circuit--;

line 39, change "means" to --circuit--;

line 42, change "means" to --circuit--;

UNITED STATES PATENT AND TRADEMARK OFFICE
CERTIFICATE OF CORRECTION

PATENT NO. : 5,623,326
DATED : April 22, 1997
INVENTOR(S) : Hiroshi OKANO

It is certified that error appears in the above-indentified patent and that said Letters Patent is hereby corrected as shown below:

Col., 4    line 44, change "means" to --circuit--;

line 45, change "means" to --circuit--;

line 48, change "means" to --circuit--;

line 55, change "means" to --circuit--;

line 56, change "means" to --circuit--;

line 57, change "means" to --circuit--;

Col. 5,    line 12, change "a difference" to --the differences--;

line 15, delete "either of";

line 23, change "during only" to --only during--;

line 26, change "means" to --circuit--;

line 27, change "means" to --circuit--;

line 29, change "means" to --circuit--;

UNITED STATES PATENT AND TRADEMARK OFFICE
CERTIFICATE OF CORRECTION

PATENT NO. : 5,623,326  Page 5 of 7
DATED : April 22, 1997
INVENTOR(S) : Hiroshi OKANO It is certified that error appears in the above-indentified patent and that said Letters Patent is hereby corrected as shown below:

Col., 5   line 45, change "an operation" to --the operation of the third embodiment--;

line 50, change "means" to --circuit--;

line 51, change "means" to --device--;

line 52, change "means 12A" to --circuit 12A-- and change "means 12B" to --device 12B--;

line 54, change "means 3" to --circuit 3-- and change "means 12B" to --device 12B--;

Col. 6,   line 1, change "means" to --device--;

line 5, change "means" to --device--;

line 23, change "means" to --circuit--;

line 25, change "means" to --circuit--;

line 26, change "means" (both occurrences) to --circuit--;

line 27, change "means" to --circuit--;

UNITED STATES PATENT AND TRADEMARK OFFICE
CERTIFICATE OF CORRECTION

PATENT NO. : 5,623,326
DATED : April 22, 1997
INVENTOR(S) : Hiroshi OKANO

It is certified that error appears in the above-indentified patent and that said Letters Patent is hereby corrected as shown below:

Col., 6     line 28, change "means" to --circuits--;

line 29, change "means" to --circuit--;

line 30, change "means" to --circuits--;

line 33, change "means" to --circuit--;

line 34, change "means" to --circuit--;

line 46, after "information" insert --,--;

line 63, delete "." before "while";

line 67, delete "be prevented from" and substitute therefor --avoid-- and change "chance" to --operating opportunity--;

Col. 7,     line 15, change "said" to --the--;

lines 25 and 26, after "operated," no new paragraph; delete "wherein"; and change "is" to --being--;

UNITED STATES PATENT AND TRADEMARK OFFICE
CERTIFICATE OF CORRECTION

PATENT NO. : 5,623,326

DATED : April 22, 1997

INVENTOR(S) : Hiroshi OKANO

It is certified that error appears in the above-indentified patent and that said Letters Patent is hereby corrected as shown below:

Col., 7      line 29, change "comprising said" to --of the--;

line 39, delete "means of";

line 42, delete "means of";

Col. 8,      lines 8 & 9, after "operated," no new paragraph; delete "wherein"; and change "is" to --being--;

Col. 8, insert the following claim 12 which was ommitted.

--12. A barrel for a phototaking lens of a camera, comprising:
    a shake correction unit for reducing a shake amount as a displacement of a camera or the phototaking lens with respect to an optical axis; and
    a setting member provided on said barrel, externally operable and enabling operation of said shake correction unit upon being operated.--

Signed and Sealed this

Second Day of September, 1997

Attest:

BRUCE LEHMAN

*Attesting Officer*        *Commissioner of Patents and Trademarks*